Nov. 1, 1955     H. T. WELP     2,722,291
BRAKE BEAM CONSTRUCTION
Filed Feb. 29, 1952     2 Sheets-Sheet 1
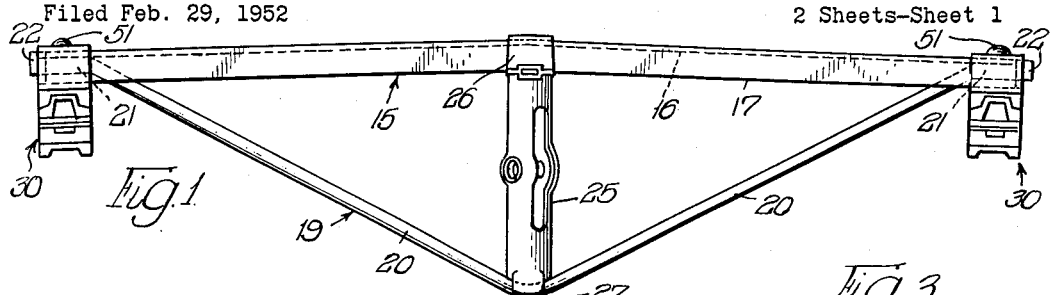
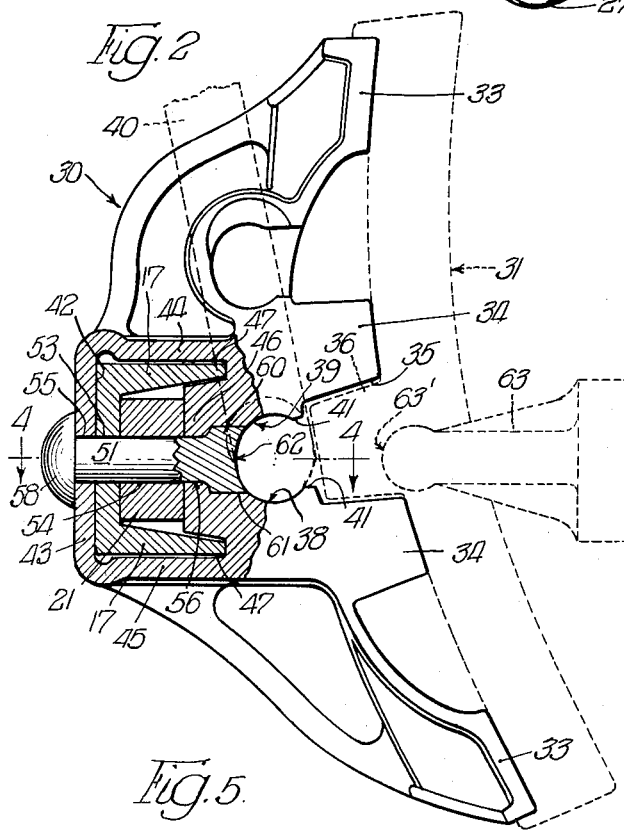
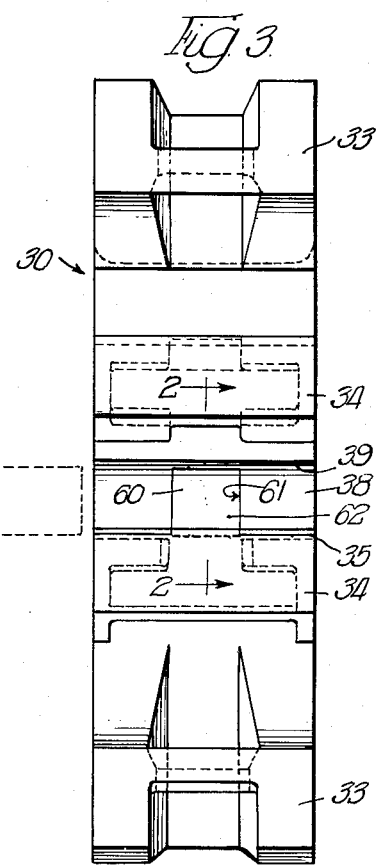
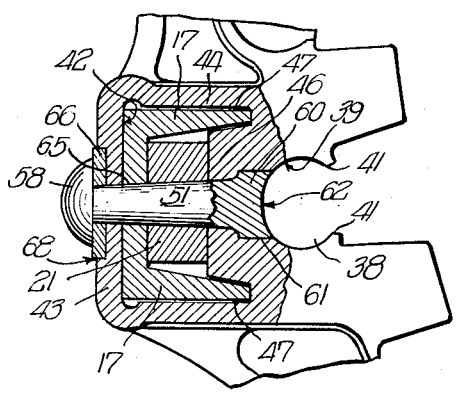
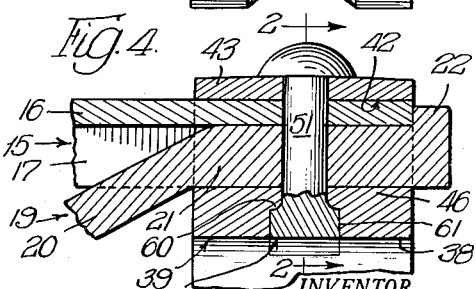
INVENTOR.
Herman T. Welp,
BY Brown, Jackson,
Boettcher & Dienner
Attys.

Nov. 1, 1955      H. T. WELP      2,722,291
BRAKE BEAM CONSTRUCTION
Filed Feb. 29, 1952      2 Sheets-Sheet 2
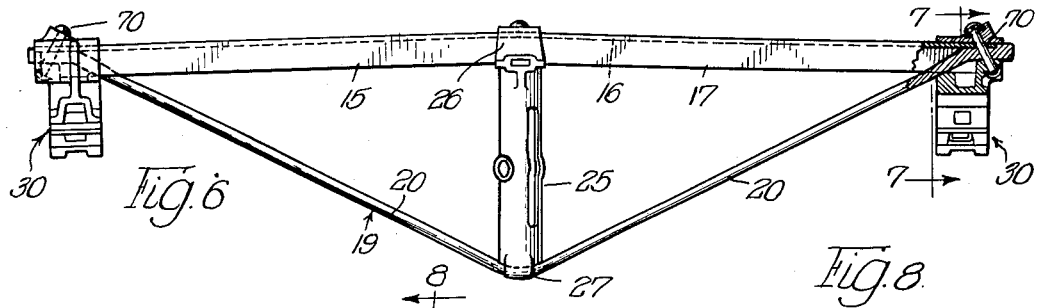
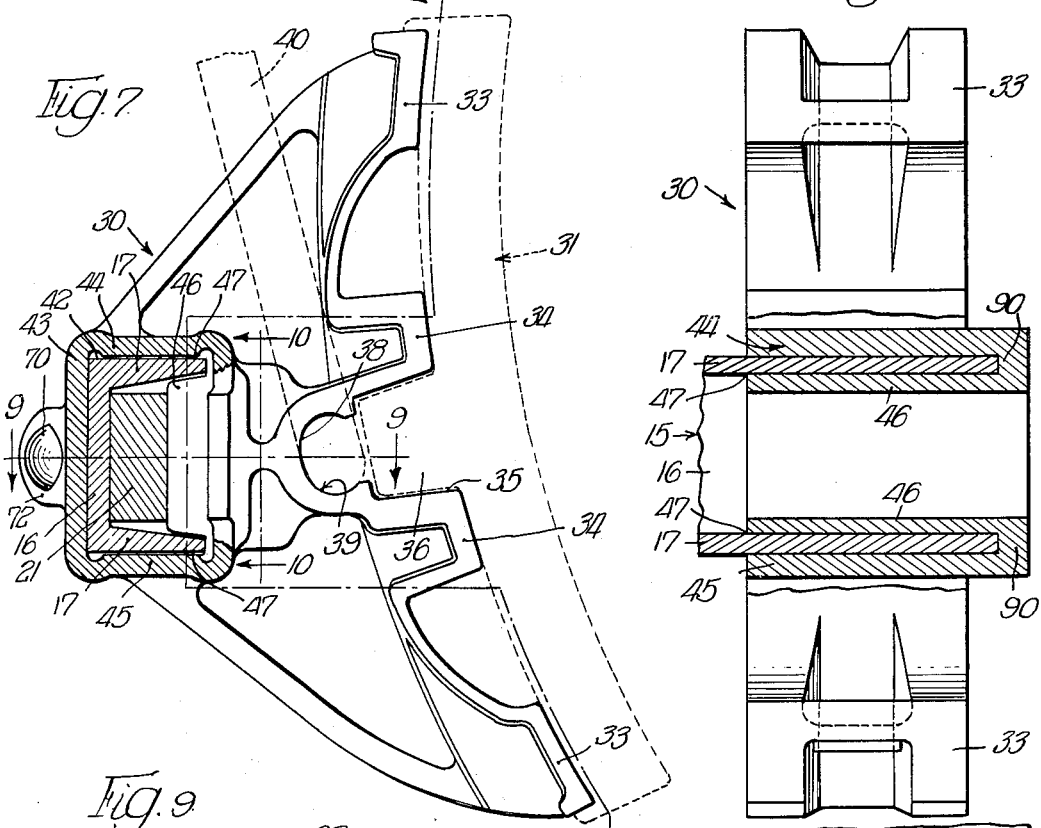
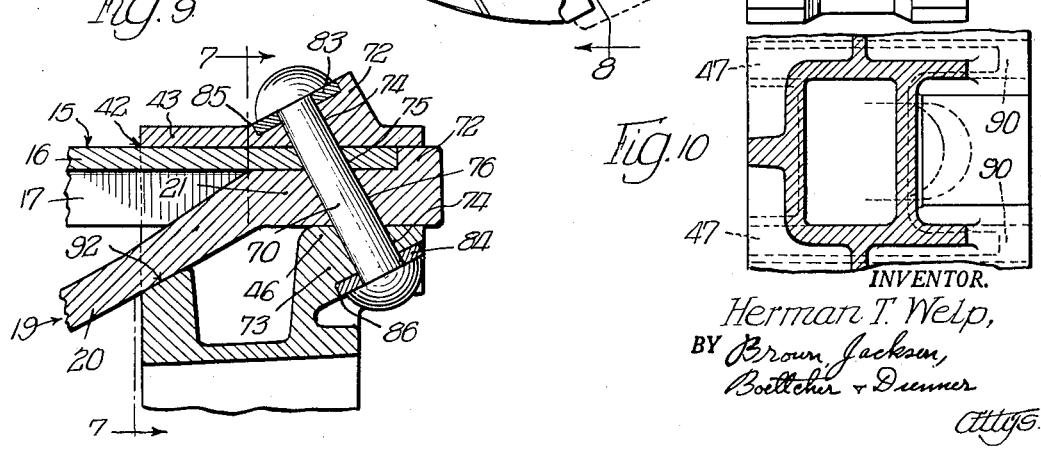
INVENTOR.
Herman T. Welp,
BY Brown, Jackson,
Boettcher & Dienner
ATTYS.

United States Patent Office 2,722,291
Patented Nov. 1, 1955

2,722,291

BRAKE BEAM CONSTRUCTION

Herman T. Welp, Chicago, Ill., assignor to Chicago Malleable Castings Company, Chicago, Ill., a corporation of Illinois Application February 29, 1952, Serial No. 274,220

13 Claims. (Cl. 188—223.1)

The present invention relates to brake beams of the truss type in which compression and tension members converge near each end of the beam and mount brake heads at the ends of the beam for carrying brake shoes and for supporting the beam.

The invention has particular reference to constructions in which the brake heads have riveted attachment to the ends of the compression and tension members, and one of the principal objects of the invention is to improve upon such riveted attachment. In one embodiment of the invention, the riveted attachment is effected by a rivet which passes substantially horizontally from the hanger slot of the brake head outwardly through the tension and compression members at right angles to the brake beam truss. As is well known to those skilled in the art, the hanger slot extends inwardly into the brake head from its concave front face, and is adapted to receive the hanger link, which extends down as a suspension link from the car truck frame. Heretofore, the practice has been to cast a large rivet opening in this hanger slot so as to accommodate the rivet set for the rivet holding the brake head on to the brake beam truss. The practice has been to have the inner rivet head seated or disposed entirely back inside this rivet opening. Thus, in this prior construction, the presence of such large rivet opening extending back into the brake head from the hanger slot has substantially reduced the effective area of bearing surface within the hanger slot. In consequence thereof, the hanger link has been subject to excessive wear, and this has been objected to by the railroads.

I avoid such objection by the performance of a unique riveting operation, as a result of which the inner end of the rivet adjacent the hanger slot is formed with a bearing surface which is substantially coextensive with the bearing surface of the hanger slot. That is to say, as a result of this riveting operation, the inner end of the rivet is formed with a head having a cylindrical depression extending transversely across its end surface, which cylindrical depression has substantially the same radius of curvature as the bearing surface of the hanger slot so as to form a continuation of this bearing surface. In consequence thereof, this specially formed rivet does not reduce the effective area of bearing surface in the hanger slot. The opening which is cast in the brake head to extend inwardly from the hanger slot for receiving this head at the inner end of the rivet, is formed of a square or other polygonal outline, so that the inner rivet head is caused to assume a substantially similar outline, whereby the rivet head and the cylindrical bearing surface formed therein are prevented from rotating out of alignment with the hanger slot bearing surface.

Another object of the invention is to improve the riveted attachment of the brake head to the brake beam truss by providing improved means for preventing the cracking of brake heads which is so likely to result from the use of cold rivets hydraulically driven. When the rivet for mounting the brake head on the brake beam truss is driven cold by powerful hydraulically operated riveting machines, there is a tendency for the driven metal of the rivet to gather beneath the rivet heads and form an expanding rivet shank directly beneath the rivet head. This gathering and expansion of the metal in the rivet shank frequently causes such an expansive strain in the rivet hole of the brake head casting as to crack the casting.

I avoid such difficulty by the use of steel washers placed to surround the rivet shanks directly beneath the rivet heads, which steel washers take up the greater portion of the strain caused by the expansion of the rivet shanks, thereby preventing the transmission of these injurious stresses to the casting. The brake head castings are preferably provided with countersunk recesses around the ends of the rivet holes for receiving these reenforcing steel washers.

Another object of the invention is to produce a better construction of truss type brake beam by providing improved stops in the brake heads at the ends of the channel-shaped compression member. The provision of these stops in the brake head for abutting the ends of the channel affords several advantages, such as: (1) preventing mis-alignment of the brake heads, (2) creating a more solid truss by reducing movement of the channel, and (3) reducing deflection in the testing of brake beams by reducing movement of the compression member and brake head.

Other objects, features and advantages of the invention will be apparent from the following detail description of different embodiments of the invention. In the accompanying drawings illustrating such embodiments:

Figure 1 is a plan view of one embodiment of my invention;

Figure 2 illustrates on a larger scale an end view of the brake beam, with the compression and tension members illustrated in section, corresponding to a section taken approximately on the plane of the line 2—2 of Figures 3 and 4;

Figure 3 is an elevational view of the concave face or front surface of each brake head;

Figure 4 is a transverse sectional view taken approximately on the plane of the line 4—4 of Figure 2;

Figure 5 is a fragmentary sectional view similar to the sectioned portion of Figure 2, but illustrating a modified form and arrangement of rivet and confining washer;

Figure 6 is a plan view, similar to Figure 1, illustrating another modified embodiment of the invention;

Figure 7 illustrates, on a larger scale, a transverse or end view of the brake beam, partly in elevation and partly in section, the sectioned portion corresponding to a section taken approximately on the plane of the line 7—7 of Figures 6 and 9;

Figure 8 is a face view of this latter embodiment of brake head, partly in section, the sectioned portion being taken approximately on the plane of the line 8—8 of Figure 7;

Figure 9 is a detail sectional view taken approximately on the plane of the line 9—9 of Figure 7, and Figure 10 is a detail sectional view taken approximately on the plane of the line 10—10 of Figure 7.

Referring first to the embodiment illustrated in Figures 1 to 4 inclusive, the brake beam comprises a compression member 15, preferably of channel-shaped cross section, consisting of a web portion 16 and side flanges 17. The beam is trussed by a tension member 19, preferably of the upset strap type. That is to say, this tension member comprises an intermediate portion 20 of rectangular bar or strap cross section having its ends upset or swaged to form the thickened end portions 21 and the right angle shouldered portions 22. The thickened end portions 21 fit snugly between the side flanges 17 of the channel 15, and the right angle shouldered portions 22 hook against the end of the channel web 16 and against the ends of the channel flanges 17. The tension member 19 is tensioned by the conventional strut 25 having flanges 26 at its front end for embracing the compression member 15, and having flanges 27 at its rear end for embracing the tension member 19. This strut is provided with the usual inclined slot for pivotally mounting an inclined brake actuating lever constituting part of the brake operating gear.

Mounted on each end of this truss type brake beam is an end structure comprising a brake head 30. As shown in Figure 2, the concave front face of this brake head is adapted to mount a removable brake shoe indicated in dotted lines at 31. The brake head has forwardly projecting end toes 33 and intermediate spaced lugs 34 for backing up the rear surface of the brake shoe. The intermediate spaced lugs 34 define a socket 35 therebetween for receiving a keying lug 36 projecting rearwardly from the brake shoe. The brake shoe is releasably held in place on the brake head by conventional fastening means, well known in the art.

Extending rearwardly from the inner end of the keying socket 35 is a hanger slot 38 formed with a substantially cylindrical bearing surface 39 extending transversely of the brake head from side-to-side thereof. This hanger slot receives the conventional hanger link 40 having pivotal movement against the substantially cylindrical bearing surface 39, such link functioning as a pivoted suspension element for suspending the end of the brake beam from an elevated point of support on the car truck. The bearing surface 39 in the hanger slot 38 is usually formed from upper and lower cylindrical bearing surfaces struck from two centers which are spaced apart vertically a relatively slight distance. Thus, the hanger slot is of somewhat elliptical outline, but for all practical purposes, insofar as the present invention is concerned, it can be considered as being of substantially cylindrical outline. The hanger link 40 has its cross-bar pivot portion also formed of this somewhat elliptical section, the narrow dimension of which will pass between the hanger slot lips 41 when the entire link is disposed horizontally, after which the link is swung up to its normal upwardly extending position in the mounting of the brake beam. In this upwardly extending position of the hanger link the elliptical formation prevents accidental outward displacement of the link from the hanger slot, such being an old and well known practice in the art.

Cored out in rear of the hanger slot 38 is an opening 42 which extends transversely of the brake head from side-to-side thereof and functions as a socket for receiving the converging end portions of the compression member 15 and tension member 19. This socket opening 42 comprises a rear wall 43, top and bottom walls 44 and 45, and a rearwardly projecting front wall 46 which is of narrower width than the rear wall 43 so as to define upper and lower openings 47 for receiving the side flanges 17 of the channel 15. In this embodiment of the invention the brake head is secured to the tension and compression members of the truss beam by a horizontally disposed rivet 51 extending transversely through the socket opening 42 and through the tension and compression members disposed in said socket opening. The compression and tension members of the truss beam have aligned circular holes 53 and 54 respectively which are aligned with holes 55 and 56 in the socket walls 43 and 46 respectively, and the rivet shank is passed through these aligned holes from the outer side of the brake head, and has its inner end headed over to produce the specially formed inner rivet head 60. The outer rivet head is indicated at 58. Heretofore, the general practice has been to provide the inner end of the rivet with a head of round or any other conventional form against which a bucking tool is held in the operation of heading over the outer end of the rivet. That is to say, a relatively large recess or cavity is usually cored out in the casting to extend rearwardly from the hanger slot 38 for the purpose of receiving this inner bucking head on the rivet, which recess or cavity is of sufficient depth and width to accommodate the bucking tool and also to dispose the bucking head of the rivet entirely forwardly of the hanger slot, so that no part of the rivet head could contact the hanger link. Heretofore, this large recess or cavity has greatly reduced the effective area of the hanger slot bearing surface 39, with the result that the hanger link 40 has been subjected to excessive wear. According to one preferred embodiment of my invention, I avoid this objection by reversing the insertion of the rivet so that it is inserted from the outside of the brake head casting; after which I form the specially shaped head 60 on the inner end of the rivet, characterized by a concave bearing surface 62 in its outer face, which constitutes a coextensive part of the substantially cylindrical bearing surface 39 of the hanger slot 38. As shown in Figure 3, the socket 61 for receiving this rivet head 60 is of square or polygonal outline for preventing rotation of the rivet, this socket being cored out to extend rearwardly from the back wall of the hanger slot 38. The specially formed head 60 is formed by the use of a specially designed rivet set, indicated in outline at 63, which is inserted into the hanger slot 38, and which has a substantially cylindrical surface 63' adapted to match with the concave bearing surface 39 of the hanger slot. This specially designed rivet set forms in the outer face of the rivet head 60 the curved concave bearing surface 62 extending across the rivet head from side-to-side thereof, and having substantially the same shape and radii of curvature as the approximately cylindrical bearing surface 39 of the hanger slot. The provision of the polygonal socket 61, and the non-rotative fit of the finished inner head 60 in this socket, prevents the possibility of the rivet rotating after setting so that the cylindrical bearing surface 62 in the outer face of the rivet head maintains a relatively close matching fit with the cylindrical bearing surface 39 of the hanger slot, and permanently remains an effective part of the bearing surface in the hanger slot for establishing rotative bearing contact with the hanger link 40. Thus, the provision of this rearwardly extending rivet does not reduce the effective area of bearing surface defining the rear wall of the hanger slot, which rear wall and upper wall receive most of the bearing pressure acting between the brake head and hanger link.

In the modified construction shown in Figure 5, the rivet 51 has a tapered shank 65 which diminishes in diameter toward the headed outer end 58. This tapered shank 65 insures a tighter fit of the rivet in connecting the brake head to the compression member and tension member of the brake beam. This tapered shank 65 also facilitates removal of the old rivet when the rivet is taken out to replace a worn out brake head, such being done by cutting off the outer head 58, and driving the tapered shank 65 inwardly back through the hanger slot 38. The provision of this tapered shank 65 affords a desirable safety feature because if the rivet shank should break near its inner end, the presence of the taper prevents the rivet from working out from the outer side of the brake head casting 30, which might permit such casting working itself off the end of the brake beam. Such broken rivet cannot work loose in an inward direction because of the presence of the hanger 40 in the hanger slot 38.

As a further modification of the above two embodiments, I also contemplate making the cylindrical shank rivet 51 of Figure 2, or the tapered shank rivet 65 of Figure 5, with a preformed head 60 having the concave bearing surface 62 preformed therein. After the insertion of this rivet from the hanger slot side of the casting, the outer head 58 may be formed in the usual manner, and, if desired, final finishing operations might be performed on this preformed head 60 at that same time, if necessary.

I have also shown another feature in connection with the embodiment of Figure 5, for the purpose of preventing or minimizing the possibility of expansion of the rivet shank from cracking the brake head casting. In order to simplify assembly operations and reduce costs, it is frequently the practice to drive the rivet cold by powerful hydraulically operated riveting machines, and in such cases there is a tendency for the driven metal of the rivet to gather beneath the rivet head and form an expanding rivet shank directly beneath the rivet head. This gathering and expansion of the metal in the rivet shank frequently causes such an expansive strain in the rivet hole of the brake head casting as to crack the casting. In these situations where the transverse rivet is driven cold, I mount a hardened steel washer 66 over the rivet shank directly under the head which is to be formed at 58 on this end of the rivet. This steel washer is seated in a circular recess or counterbore 68 in the rear wall 43 of the socket opening 42. Such hardened steel washer 66 takes up the greater portion of the strain caused by the swelling of the rivet shank, and thereby relieves the brake head casting of the major portion of this expansive stress. A corresponding steel washer may also be placed over the inner end of the rivet shank directly back of the inner head 60. Such steel washer or washers may also be used with the cylindrical shank rivet of Figure 2. These steel washers may be so composed or treated as to be substantially non-corrosive, such as by a stainless steel composition or by a galvanized, or cadmium plating treatment or the like.

Referring now to the embodiment illustrated in Figures 6 to 10 inclusive, this embodiment has each brake head secured to its respective end of the truss beam by a diagonal rivet which passes through the brake head and through the compression and tension members of the truss beam at a sloping angle, so that the inner end of the rivet does not come within the hanger slot. Such diagonal rivet, indicated at 70, is disposed at the outer side of the brake head, adjacent to the outer end of the socket opening 42 which receives the compression and tension members of the brake beam. Preferably, this diagonal rivet also has a tapered shank to insure a tighter fit in the rivet holes and also to facilitate removal of a broken rivet. A sloping boss 72 projects outwardly from the outer wall 43 of the socket opening 42, and a sloping boss 73 projects inwardly from the inner wall 46 of the socket opening, and these two sloping bosses have aligned holes 74 therein through which the shank of the diagonal rivet passes. The web 16 of the compression channel 15, and the upset end portion 21 of the tension strap have aligned sloping holes 75 and 76 therein through which the inclined rivet passes. It will thus be seen that in this construction employing an inclined or diagonal rivet, the inner end of the rivet is removed entirely from the hanger slot 38 and is readily accessible from the outside of the brake head.

Surrounding the rivet shank under each rivet head 81 and 82 is a snug fitting steel washer 83 and 84, set into cavities or counterbores 85 and 86 formed in the sloping bosses 72 and 73. These snug fitting steel washers enable the rivets to be driven cold by a hydraulic riveting machine without the possibility of any injurious degree of rivet shank expansion, such as can crack the brake head casting.

In this embodiment of the invention I have also illustrated the provision of end stops in the outer end of each socket opening 42 against which the beam channel 15 has endwise abutment. These end stops are indicated at 90 (Figure 8), consisting of cast webs or transverse walls which close the ends of the trough-shaped guideways 47 at the outer side of the brake head. As previously described, these trough-shaped portions 47 of the socket opening 42 receive the side flanges 17 of the beam channel 15. The end stops 90 form transverse abutments across the outer ends of these trough-shaped ways 47, so that the ends of the channel flanges 17 bear in compression abutment against these end stops. The parts are proportioned so that when the ends of the channel are abutting against these end stops the rivet holes in the brake head and in the compression and tension members 15 and 19 will be in alignment, and the diagonal rivet is driven and headed with the parts thus held in this assembled relation. These end stops 90 do not extend outwardly beyond the trough-shaped ways 47, and hence they do not prevent the shouldered end portion 22 of the tension strap from projecting outwardly beyond the end of the channel for hooking engagement against the ends of the channel web and flanges. In this modified embodiment illustrated in Figures 6–10 inclusive, the inclined slope of the tension strap portion 20 is carried up further into the brake head toward the diagonal rivet, and in such construction the inner wall 46 of the socket opening 42 is formed with an inclined slope indicated at 92 in Figure 9, so as to accommodate the slope of the tension strap extending up into the brake head.

While I have illustrated and described what I regard to be preferred embodiments of my invention, nevertheless it will be understood that such are merely exemplary and that other modifications and rearrangements may be made therein without departing from the essence of the invention.

I claim:

1. In a break beam, the combination of compression and tension members arranged to form a truss having ends extending longitudinally thereof, brake heads on such ends of the truss, each of said brake heads being formed with hanger slots therein provided with cylindrical bearing surfaces for bearing engagement against hanger links engaging in said hanger slots, rivets extending through said brake heads and through said compression and tension members for securing said brake heads to said brake beam, and substantially cylindrical bearing surfaces formed in the heads at the inner ends of said rivets lying coextensive with the cylindrical bearing surfaces in said hanger slots.

2. In a brake beam, the combination of compression and tension members arranged to form a truss having ends extending longitudinally thereof, brake heads on such ends of the truss, each of said brake heads being formed with hanger slots therein provided with cylindrical bearing surfaces for bearing engagement against hanger links engaging in said hanger slots, rivets extending from said brake heads through said compression and tension members for securing said brake heads to said brake beam, substantially cylindrical bearing surfaces formed in the heads at the inner ends of said rivets lying coextensive with the cylindrical bearing surfaces in said hanger slots, and means for holding said rivets against rotation so as to maintain said bearing surfaces in alignment.

3. In a railway brake beam of the truss type, the combination of a compression member and a tension member with their end portions converging, brake heads mounted on said converging end portions, each of said brake heads being formed with hanger slots therein provided with substantially cylindrical bearing surfaces adapted to have pivotal bearing engagement with hanger links engaging in said hanger slots, rivets adapted to be inserted through said brake heads and passing through aligned holes in said compression and tension members for securing said brake heads to said brake beam, polygonal heads formed on the inner ends of said rivets seating in polygonal sockets cored rearwardly from said hanger slots, and concave cylindrical bearing surfaces formed in the end faces of said polygonal heads forming continuations of the cylindrical bearing surfaces in said hanger slots.

4. In a railway brake beam of the truss type, the combination of a compression member of channel section and a strap type of tension member having upset ends coacting with the ends of said channel member, brake heads mounted on the ends of said brake beam, each of said brake heads being formed with socket openings extending transversely through the brake head for receiving the ends of said compression and tension members, each of said brake heads being formed with hanger slots extending transversely through the brake head and having substantially cylindrical bearing surfaces adapted to have pivotal bearing engagement with hanger links engaging in said hanger slots, rivets passing transversely through said socket openings and through the compression and tension members disposed therein, polygonal sockets cored out in the rear walls of said hanger slots into which the heads at the inner ends of said rivets are upset and formed preventing rotation of said rivets, and concave cylindrical bearing surfaces shaped in the end faces of said rivet heads forming continuations of the cylindrical bearing surfaces of said hanger slots.

5. In a railway brake beam of the truss type, the combination of a compression member of channel section and a strap type of tension member having upset ends coacting with the ends of said channel member, brake heads mounted on the ends of said brake beam, each of said brake heads being formed with socket openings extending transversely through the brake head for receiving the ends of said compression and tension members, each of said brake heads being formed with hanger slots extending transversely through the brake head and having substantially cylindrical bearing surfaces adapted to have pivotal bearing engagement with hanger links engaging in said hanger slots, rivets passing transversely through said socket openings and through the compression and tension members disposed therein, polygonal sockets cored out in the rear walls of said hanger slots, polygonal heads on the inner ends of said rivets engaging in said polygonal sockets, said rivets having tapering shanks diminishing in diameter outwardly through said socket openings and through said compression and tension members, and concave cylindrical bearing surfaces formed in the end faces of said polygonal heads forming continuations of the cylindrical bearing surfaces of said hanger slots.

6. In a brake beam, the combination of compression and tension members arranged to form a truss having ends extending longitudinally thereof, brake heads on such ends of the truss, each of said brake heads being formed with hanger slots therein provided with cylindrical bearing surfaces for bearing engagement against hanger links engaging in said hanger slots, rivets extending from said hanger slots through said brake heads and through said compression and tension members for securing said brake heads to said brake beam, outer heads on the outer ends of said rivets, steel washers surrounding the rivet shanks under said outer heads for preventing expansion of the rivet shanks in the heading operation from cracking the brake head castings, inner heads on the inner ends of said rivets, and cylindrical bearing surfaces formed in said inner heads lying coextensive with the cylindrical bearing surfaces in said hanger slots.

7. In a railway brake beam, the combination of compression and tension members arranged with their ends converging to form a truss, malleable iron brake head castings mounted on the converging ends of said members, an iron rivet passing through each of said brake head castings and the adjacent converging ends of said members for securing said castings thereto, each of said iron rivets having a headed end which is formed in a cold riveting operation at one end of the rivet shank after said rivet has been passed through said casting and members, and a reinforcing hardened steel collar snugly fitting over the latter portion of said rivet shank directly back of said headed end whereby said hardened steel collar positively confines this portion of the rivet shank against outward expansion during the cold riveting operation so as to avoid cracking the surface of said casting.

8. In a railway brake beam of the class described, the combination of a beam structure, a malleable iron brake head casting on each end of said beam structure, an iron rivet having its shank passing through aligned holes in said brake head casting and beam structure, one end of said rivet shank having a head formed in a cold riveting operation after said rivet shank is in place in said brake head casting and beam structure, and a steel reinforcing member tightly embracing the latter portion of said rivet shank directly back of said headed end whereby said steel reinforcing member positively confines that portion of the rivet shank directly back of the headed end against outward expansion during the cold riveting operation so as to avoid cracking the surface of said casting, while permitting outward expansion of the inner portion of the rivet shank at points spaced from the surface of said casting.

9. In a railway brake beam of the class described, the combination of a beam structure, a malleable iron brake head casting on each end of said beam structure, each end of said beam structure and the brake head castings mounted thereon having aligned rivet holes therein, a recess formed in the outer surface of each casting around its respective rivet hole, an iron rivet having its shank passing through said aligned rivet holes and through said recess, a hardened steel reinforcing collar snugly fitting over said rivet shank and set down into said recess, and a rivet head on the outer end of said rivet shank abutting against the outer surface of said hardened steel reinforcing collar and formed by a cold riveting operation after said rivet is in place, said steel reinforcing collar preventing radial expansion of the rivet shank in the outer surface plane of said casting during the heading operation so as to prevent the starting of surface cracks in the casting as a result of riveting stresses.

10. In a railway brake beam of the truss type, the combination of a compression member of channel section and a strap type of tension member having upset ends coacting with the ends of said channel member, brake heads mounted on the ends of said brake beam, each of said brake heads being formed with socket openings extending transversely through the brake head for receiving the ends of said compression and tension members, each of said brake heads being formed with hanger slots extending transversely through the brake head and having substantially cylindrical bearing surfaces adapted to have pivotal bearing engagement with hanger links engaging in said hanger slots, rivets passing from said hanger slots transversely through said socket openings and through the compression and tension members disposed therein, said rivets having tapering shanks diminishing in diameter outwardly through said socket openings and through said compression and tension members, inner and outer heads on said rivets, hardened steel washers having snug fits on the shanks of said rivets for preventing the expansion of the rivet shanks occurring in the heading operation from cracking the brake head castings, and concave cylindrical bearing surfaces formed in the end faces of the inner rivet heads forming continuations of the cylindrical bearing surfaces of said hanger slots.

11. In a railway brake beam of the truss type, the combination of a compression member and a tension member with their end portions converging, brake heads mounted on said converging end portions, each of said brake heads being formed with hanger slots therein provided with substantially cylindrical bearing surfaces adapted to have pivotal bearing engagement with hanger links engaging in said hanger slots, rivets passing through said brake heads and through said compression and tension members for securing said brake heads to said brake beam, said rivets having tapering shanks diminishing in diameter outwardly toward their outer ends, heads on the inner ends of said rivets adjacent said hanger slots, and concave cylindrical bearing surfaces formed in the end faces of said inner heads forming continuations of the cylindrical bearing surfaces in said hanger slots.

12. In the art of constructing a railway brake beam of the type wherein each brake head has a hanger slot having a substantially cylindrical bearing surface for receiving a hanger link, the method of securing said brake head to the brake beam which comprises passing through aligned rivet holes in the brake head and brake beam a rivet having a preformed outer head which is held in abutment against the outer side of said brake head, with the opposite or inner end of the rivet shank substantially intersecting the cylindrical bearing surface of the hanger slot, and forming a head on such inner end of the rivet shank characterized by a concave cylindrical bearing surface in its end face lying coextensive with the cylindrical bearing surface in said hanger slot.

13. In a brake beam, the combination of compression and tension members arranged to form a truss having ends extending longitudinally thereof, brake heads on such ends of the truss, each of said brake heads being formed with hanger slots therein provided with substantially cylindrical bearing surfaces for bearing engagement against hanger links engaging in said hanger slots, rivets extending through said brake heads and through said compression and tension members for securing said brake heads to said brake beam, preformed heads on the inner ends of said rivets, and substantially cylindrical bearing surfaces preformed in the end faces of said rivet heads lying coextensive with the cylindrical bearing surfaces in said hanger slots.

References Cited in the file of this patent

UNITED STATES PATENTS

| Number | Name | Date |
|---|---|---|
| 766,362 | Lamont | Aug. 2, 1904 |
| 884,446 | Williams | Apr. 14, 1908 |
| 1,851,934 | Stockfleth | Mar. 29, 1932 |
| 2,375,116 | Larkin | May 1, 1945 |
| 2,493,239 | Ekholm | Jan. 3, 1950 |
| 2,499,315 | Johnson | Feb. 28, 1950 |
| 2,587,915 | Spaeth | Mar. 4, 1952 |